(12) United States Patent
Bharti (10) Patent No.: US 11,820,395 B2
(45) Date of Patent: Nov. 21, 2023

(54) VEHICULAR DRIVING ASSIST SYSTEM WITH UNPARKING ALERT

(71) Applicant: Magna Electronics Inc., Auburn Hills, MI (US)

(72) Inventor: Brijendra Kumar Bharti, Brampton (CA)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 17/809,278

(22) Filed: Jun. 28, 2022

(65) Prior Publication Data

US 2022/0410918 A1    Dec. 29, 2022

Related U.S. Application Data

(60) Provisional application No. 63/202,855, filed on Jun. 28, 2021.

(51) Int. Cl.
*H04N 5/44* (2011.01)
*B60W 50/14* (2020.01)
*B60W 30/06* (2006.01)
*G06V 20/58* (2022.01)
*G01S 15/931* (2020.01)
*B60W 50/00* (2006.01)

(52) U.S. Cl.
CPC ............ *B60W 50/14* (2013.01); *B60W 30/06* (2013.01); *G01S 15/931* (2013.01); *G06V 20/58* (2022.01); *B60W 2050/0005* (2013.01); *B60W 2050/143* (2013.01); *B60W 2050/146* (2013.01); *B60W 2420/42* (2013.01); *B60W 2420/54* (2013.01); *B60W 2520/06* (2013.01)

(58) Field of Classification Search
CPC ................. B60W 50/14; B60W 30/06; B60W 2050/0005; B60W 2050/143; B60W 2050/146; B60W 2420/42; B60W 2420/54; B60W 2520/06; G01S 15/931; G06V 20/58; G06V 20/586
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |

(Continued)

*Primary Examiner* — Munear T Akki
(74) *Attorney, Agent, or Firm* — HONIGMAN LLP (57) ABSTRACT

A vehicular driver assistance system includes a propulsion selection sensor operable to provide an output representative of a current direction of propulsion of a vehicle. The system, responsive to the output, determines an entry propulsion direction used by the vehicle to enter a parking space. The system stores the determined entry propulsion direction used by the vehicle to enter the parking space. The system, responsive to the vehicle preparing to exit the parking space, determines an exit propulsion direction of the vehicle. The system compares the stored determined entry propulsion direction used by the vehicle to enter the parking space and the exit propulsion direction of the vehicle. The system, responsive to determining that the stored determined entry propulsion direction used by the vehicle to enter the parking space is the same as the exit propulsion direction of the vehicle, provides an alert to a driver of the vehicle.

21 Claims, 4 Drawing Sheets

(56) References Cited

U.S. PATENT DOCUMENTS

| | | |
|---|---|---|
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 8,874,317 B2 | 10/2014 | Marczok et al. |
| 10,071,687 B2 | 9/2018 | Ihlenburg et al. |
| 10,099,614 B2 | 10/2018 | Diessner |
| 10,190,560 B2 | 1/2019 | Tedesco et al. |
| 10,234,868 B2 * | 3/2019 | Lavoie .................. G05D 1/0285 |
| 2015/0344028 A1 | 12/2015 | Gieseke et al. |
| 2017/0015312 A1 | 1/2017 | Latotzki |
| 2017/0017848 A1 | 1/2017 | Gupta et al. |
| 2017/0050672 A1 | 2/2017 | Gieseke et al. |
| 2017/0253237 A1 | 9/2017 | Diessner |
| 2017/0317748 A1 | 11/2017 | Krapf |
| 2017/0329346 A1 | 11/2017 | Latotzki |
| 2018/0315312 A1 * | 11/2018 | Hayakawa .............. B60R 21/00 |
| 2019/0009773 A1 * | 1/2019 | Miyahara ............. B62D 15/028 |
| 2019/0193725 A1 * | 6/2019 | Suzuki ................. G05D 1/0038 |
| 2019/0233009 A1 * | 8/2019 | Joos ...................... B60W 30/06 |
| 2019/0283738 A1 * | 9/2019 | Hüger ................. G06V 20/588 |
| 2020/0282975 A1 * | 9/2020 | Minase .................. B60L 15/30 |
| 2020/0401127 A1 * | 12/2020 | Kramer ................. G08G 1/144 |
| 2021/0179085 A1 * | 6/2021 | Nakada ................. B60W 30/06 |

* cited by examiner

VEHICULAR DRIVING ASSIST SYSTEM WITH UNPARKING ALERT

CROSS REFERENCE TO RELATED APPLICATION

The present application claims the filing benefits of U.S. provisional application Ser. No. 63/202,855, filed Jun. 28, 2021, which is hereby incorporated herein by reference in its entirety.

FIELD OF THE INVENTION

The present invention relates generally to a vehicular driver assistance system for a vehicle and, more particularly, to a vehicular driver assistance system that utilizes a gear position system.

BACKGROUND OF THE INVENTION

Use of imaging sensors in vehicle imaging systems to detect objects exterior of the vehicle is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular driver assistance system includes a propulsion selection sensor disposed at a vehicle equipped with the vehicular driver assistance system. The propulsion selection sensor is operable to provide an output representative of a current direction of propulsion of the vehicle that is selected by a driver of the vehicle. The system includes an electronic control unit (ECU) with electronic circuitry and associated software. The electronic circuitry of the ECU includes a processor for processing the output provided by the propulsion selection sensor. The vehicular driver assistance system, responsive to processing the output of the propulsion selection sensor, determines an entry propulsion direction used by the vehicle to enter a parking space. The vehicular driver assistance system stores the determined entry propulsion direction used by the vehicle to enter the parking space. The vehicular driver assistance system, responsive to the vehicle preparing to exit the parking space, determines an exit propulsion direction of the vehicle. The vehicular driver assistance system compares the stored determined entry propulsion direction used by the vehicle to enter the parking space and the exit propulsion direction of the vehicle. The vehicular driver assistance system, responsive to determining that the stored determined entry propulsion direction used by the vehicle to enter the parking space is the same as the exit propulsion direction of the vehicle, provides an alert to a driver of the vehicle.

These and other objects, advantages, purposes and features of the present invention will become apparent upon review of the following specification in conjunction with the drawings.

DESCRIPTION OF THE PREFERRED EMBODIMENTS

A vehicular driving assist system and/or alert system may operate to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
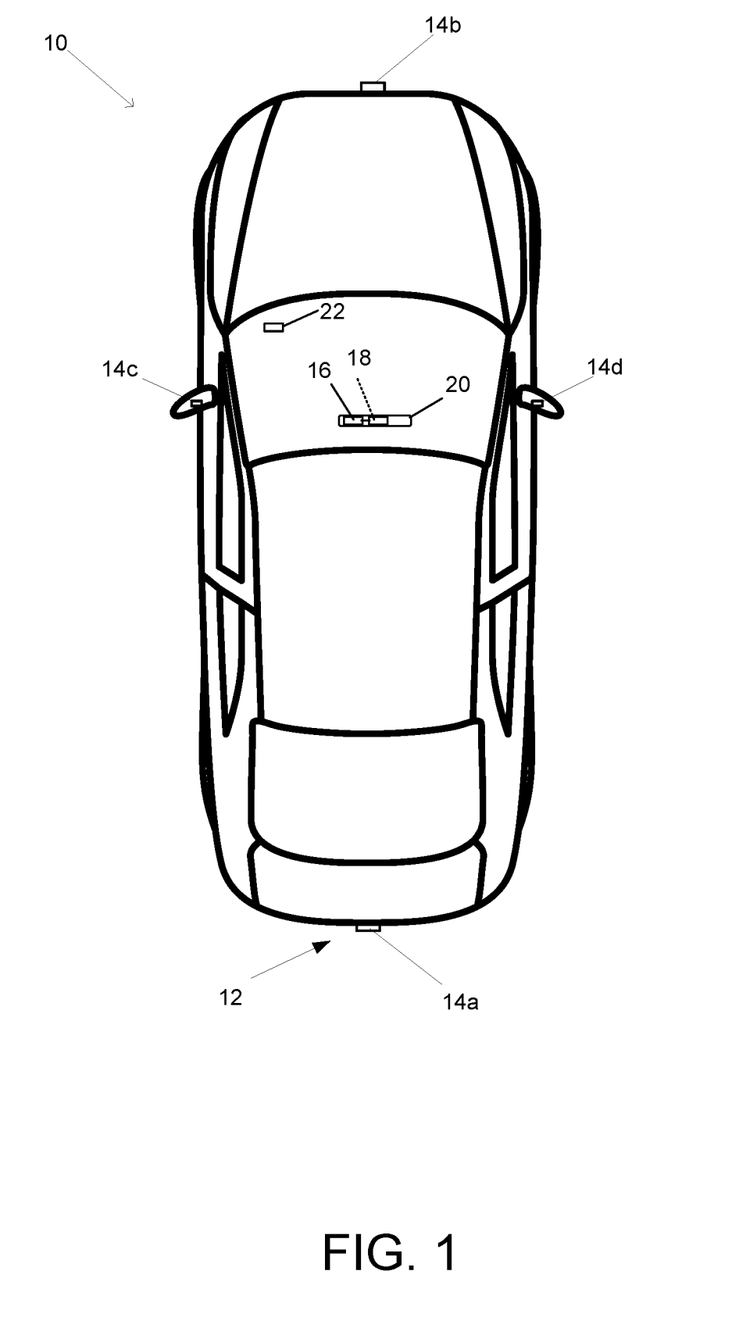
FIG. 1 is a plan view of a vehicle with a vision system that incorporates cameras.

Referring now to the drawings and the illustrative embodiments depicted therein, a vehicle 10 includes a driver assistance system or vision system 12 that may include at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The system includes a gear position sensor 22 (or selected propulsion direction sensor) that detects or determines a current gear (e.g., drive, reverse, etc.) of the vehicle.

The gear position sensor 22 may be an output of the gear/propulsion direction selection system (e.g., an output from a gear or propulsion mode select module). As used herein, "gear" such as forward gear or reverse gear refers to the direction of propulsion the vehicle is set for (i.e., forward or reverse) and does not require or imply a gearbox or transmission. For example, when an electric vehicle is placed in "forward gear," the vehicle will respond to a propulsion or acceleration request (e.g., by pressing the accelerator) by moving forward. Similarly, when a vehicle (whether an electric vehicle or otherwise) is placed in a "rear gear" or "reverse gear," the vehicle will respond to acceleration requests by moving rearward or in reverse direction. The vehicle enters a parking space with an entry propulsion direction and leaves a parking space with an exit propulsion direction.

The driver assistance system 12 includes a control or electronic control unit (ECU) 18 having electronic circuitry and associated software, with the electronic circuitry including a data processor or image processor that is operable to process image data captured by the camera or cameras and/or sensor data from the gear position sensor. For example, the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The ECU may include memory or other storage to store data captured by the sensors (e.g., the cameras and/or gear position sensor). The data transfer or signal communication from the sensors to the ECU and from the ECU to the storage may comprise any suitable data or communication link, such as a vehicle network bus or the like of the equipped vehicle.

Figure 2A:
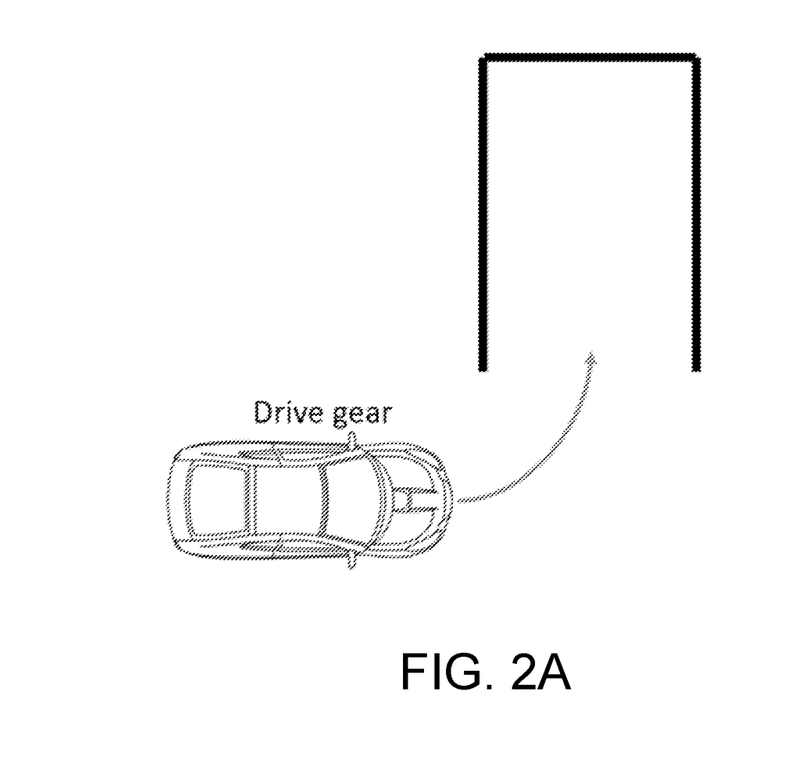
FIGS. 2A and 2B are schematic views of a vehicle entering and leaving a parking space.
Figure 2B:
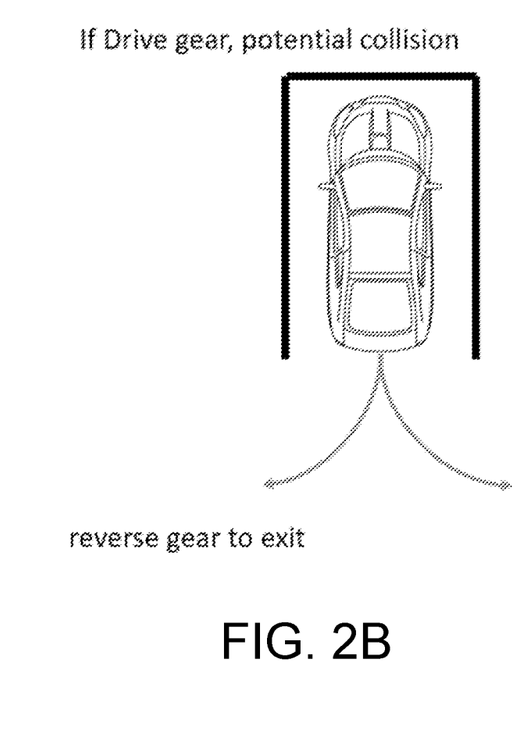
Figure 3A:
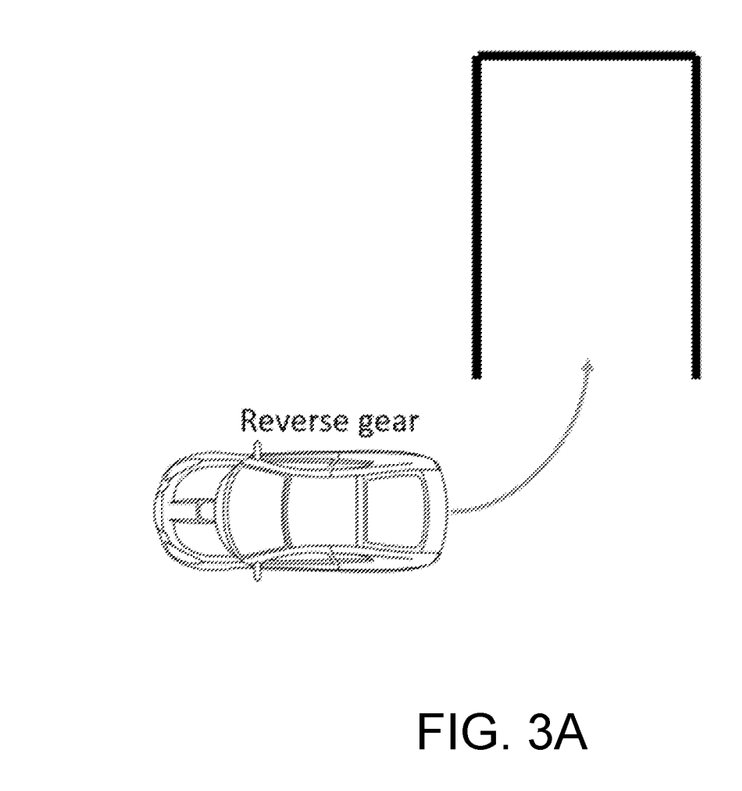
FIGS. 3A and 3B are schematic views of a vehicle reversing to enter and then leaving a parking space.
Figure 3B:
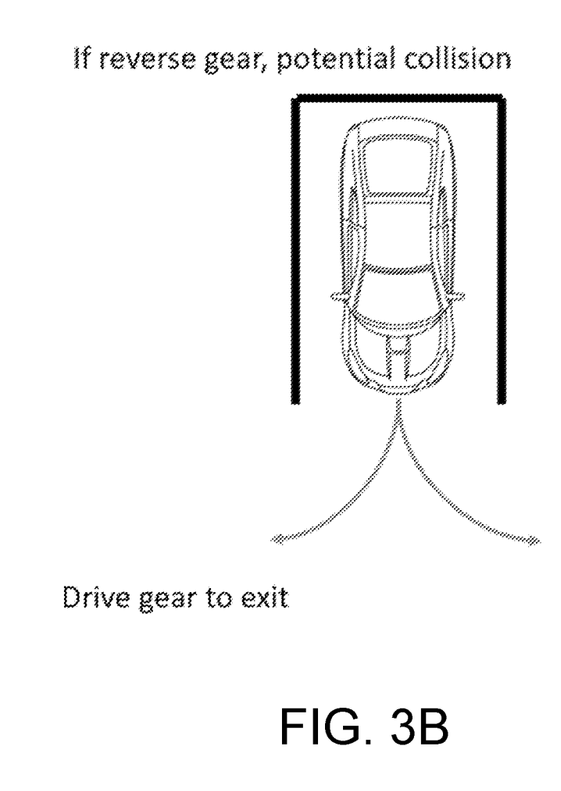
Figure 4A:
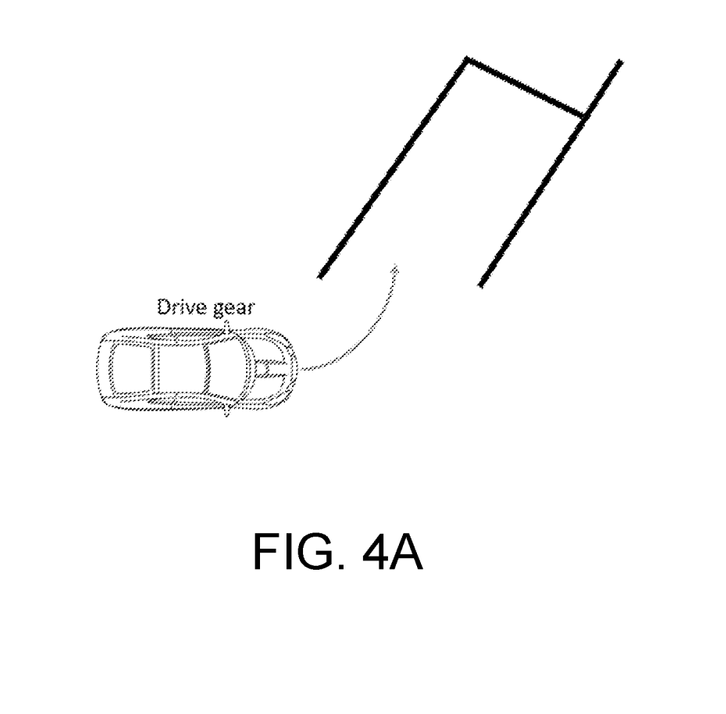
FIGS. 4A and 4B are schematic views of a vehicle entering and leaving an angled parking space.
Figure 4B:
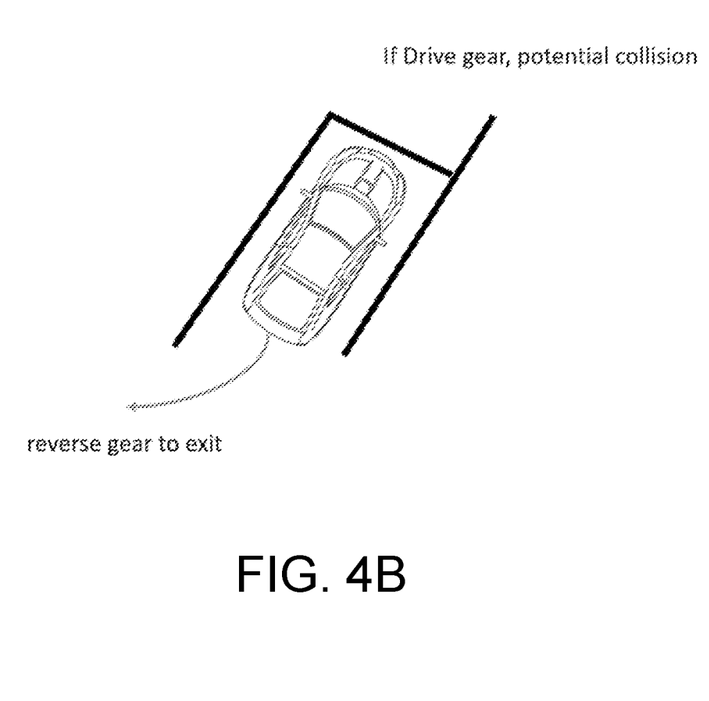

When a driver starts a parked vehicle and shifts into gear (e.g., reverse gear/propulsion or forward/drive gear/propulsion or when the driver of an electric vehicle selects forward or rearward propulsion), it is not uncommon for the driver to shift into the wrong gear due to, for example, a distraction, fatigue, human error, etc. For instance, as shown in FIG. 2A, a driver may drive forward into a parking space (i.e., pull into the space with the vehicle in the drive gear) to park the vehicle in the parking space. When preparing to leave the parking space at a later time, the driver may inadvertently place the vehicle in the drive gear again instead of a reverse gear. If the driver unexpectedly pulls forward (instead of reversing), the driver may collide with an object (such as, for example, a wall or building or other vehicle). Similarly, as shown in FIGS. 3A and 3B, a driver may use a reverse gear to reverse or back into a parking space (FIG. 3A) and, if the driver unintentionally enters the reverse gear when attempting to leave the parking space, the vehicle may collide with an object. FIG. 4A is another example of a vehicle entering a parking space using a drive gear where the vehicle must use a reverse gear to exit (FIG. 4B). In most parking situations (such as those shown in FIGS. 2A-4B), the vehicle is parked using a drive or reverse gear, and is unparked using the opposite direction gear.

The vehicular driving assist system described herein includes storing (e.g., in nonvolatile memory disposed at the vehicle) the gear position or selection of the gear that the vehicle used to enter a parking space or location. For example, when a vehicle pulls into a parking space using the drive gear, the system will store the "last gear used" as the drive gear. Similarly, when a vehicle reverses or backs into a parking space using the reverse gear, the system will store the last gear used as the reverse gear.

When the driver shifts the vehicle out of the parking gear when preparing to leave the parking space or area, and the gear that the driver shifts into matches the stored last gear used, the system may notify the driver. For example, the system may provide a visual alert (e.g., via one or more displays disposed within the vehicle), an audible alert (e.g., by playing a sound over speakers disposed within the vehicle), and/or a haptic feedback (e.g., by vibrating the steering wheel or driver seat). In a specific example, a driver enters a parking space (e.g., a garage) with a vehicle using the drive gear, then places the vehicle in the parking gear. The system stores the last gear used as the forward or drive gear. At a later point in time, the driver starts the vehicle again and then shifts the vehicle into the drive gear in order to leave the parking space. Because the last gear used matches the gear the driver shifted the vehicle into (i.e., the drive gear), the system may provide an alert to the driver warning that the vehicle may be in an improper gear. The alert may include a visual or audible display of the last gear used (i.e., the forward gear or the reverse gear).

Thus, the system may alert the driver of a potential collision or other accident without the expense or time required of more sophisticated object detection systems. For example, some object detection systems (e.g., systems that rely on image data captured by camera in front of or behind a vehicle) can take several seconds to become operational after starting a vehicle. In some scenarios, the driver has the ability to begin moving the vehicle prior to these systems being operational. In these scenarios, the object detection system may not have time to warn the driver when the driver inadvertently uses the wrong gear or propulsion direction (e.g., drive instead of reverse or vice versa). Additionally, a vehicle may be equipped without at least a portion of these systems to lower expenses (e.g., a vehicle may be equipped with a rear viewing camera but not a forward viewing camera).

In some examples, the system may incorporate data from other sensors, such as the cameras 14, ultrasonic sensors, etc. In these examples, the system may only provide the alert to the driver when the system detects an object in the potential path of the vehicle. For example, when the last gear used is the drive gear and the driver places the vehicle back into the drive gear when preparing to leave a parking space, the system may determine whether any objects are in front of the vehicle. When no objects are present (for example, when the driver "pulls through" a parking space in a parking lot, and thus the vehicle is free to leave the parking space by travelling forward), the system may elect to not notify the driver. The system may determine whether the data from the other sensors is available and base its output partially on the availability of the other systems. For example, when the driver shifts the vehicle into gear prior to sensor data being available from the camera, the system may alert the driver when the last used gear matches the current gear whenever the other sensor data is unavailable. In some examples, the system may temporarily prohibit the vehicle from moving. For example, when the system determines the last used gear is the same as the current gear and another sensor (e.g., an ultrasonic sensor, a camera, etc.) determines a potential object is present, the system may at least temporarily inhibit or prohibit movement of the vehicle using the current gear. For example, when a driver pulls forward into a parking space and then, when attempting to leave the parking space, places the vehicle from the parking gear into the driver gear, the system may determine, using one or more sensors, whether there is an object in front of the vehicle. When there is an object in front of the vehicle, and because the last gear used (i.e., the drive gear) matches the current gear (i.e., the drive gear), the system may alert the driver and/or control motion of the vehicle (e.g., apply the brake, shift the vehicle into a different gear, disable the accelerator, etc.).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver assistance system, the vehicular driver assistance system comprising:

a propulsion selection sensor disposed at a vehicle equipped with the vehicular driver assistance system, the propulsion selection sensor operable to provide an output representative of a current direction of propulsion of the vehicle that is selected by a driver of the vehicle;

an electronic control unit (ECU) comprising electronic circuitry and associated software;

wherein the output of the propulsion selection sensor is provided to the ECU;

wherein the vehicular driver assistance system, responsive to the output of the propulsion selection sensor, determines an entry propulsion direction used by the vehicle to enter a parking space;

wherein the vehicular driver assistance system stores the determined entry propulsion direction used by the vehicle to enter the parking space;

wherein the vehicular driver assistance system, responsive to the vehicle preparing to exit the parking space, determines an exit propulsion direction of the vehicle;

wherein the vehicular driver assistance system compares the stored determined entry propulsion direction used by the vehicle to enter the parking space and the exit propulsion direction of the vehicle; and wherein the vehicular driver assistance system, responsive to determining that the stored determined entry propulsion direction used by the vehicle to enter the parking space is the same as the exit propulsion direction of the vehicle, provides an alert to a driver of the vehicle.

2. The vehicular driver assistance system of claim 1, wherein the vehicular driver assistance system determines the entry propulsion direction used by the vehicle to enter the parking space based on a propulsion direction used by the vehicle prior to the vehicle being shifted into a parking state.

3. The vehicular driver assistance system of claim 1, wherein the vehicular driver assistance system determines the exit propulsion direction of the vehicle based on a propulsion direction that is selected by the driver of the vehicle when the vehicle is in a parking state and before the vehicle begins to move to exit the parking space.

4. The vehicular driver assistance system of claim 1, wherein the vehicular driver assistance system, responsive to determining the entry propulsion direction used by the vehicle to enter the parking space, stores the determined entry propulsion direction in nonvolatile memory.

5. The vehicular driver assistance system of claim 1, further comprising a camera, wherein the vehicular driver assistance system, responsive to determining that the entry propulsion direction used by the vehicle to enter the parking space is the same as the exit propulsion direction of the vehicle and responsive to determining that an object is present in a path of the vehicle based on image data captured by the camera, provides the alert to the driver.

6. The vehicular driver assistance system of claim 1, further comprising an ultrasonic sensor, and wherein the vehicular driver assistance system, responsive to determining that the entry propulsion direction used by the vehicle to enter the parking space is the same as the exit propulsion direction of the vehicle and responsive to determining that an object is present in a path of the vehicle based on sensor data captured by the ultrasonic sensor, provides the alert to the driver.

7. The vehicular driver assistance system of claim 1, wherein the alert comprises a visual alert displayed on a display disposed within the vehicle.

8. The vehicular driver assistance system of claim 1, wherein the alert comprises an audible alert.

9. The vehicular driver assistance system of claim 1, wherein the entry propulsion direction used to enter the parking space is a forward propulsion direction and wherein the exit propulsion direction of the vehicle is also the forward propulsion direction.

10. The vehicular driver assistance system of claim 1, wherein the entry propulsion direction used to enter the parking space is a reverse propulsion direction and wherein the exit propulsion direction of the vehicle is also the reverse propulsion direction.

11. The vehicular driver assistance system of claim 1, wherein the vehicular driver assistance system provides the alert to the driver responsive to determining that data from another sensor is unavailable.

12. The vehicular driver assistance system of claim 11, wherein the other sensor comprises one selected from the group consisting of (i) a camera, (ii) a radar sensor, and (iii) an ultrasonic sensor.

13. A vehicular driver assistance system, the vehicular driver assistance system comprising:
  a propulsion selection sensor disposed at a vehicle equipped with the vehicular driver assistance system, the propulsion selection sensor operable to provide an output representative of a current direction of propulsion of the vehicle that is selected by a driver of the vehicle;
  an electronic control unit (ECU) comprising electronic circuitry and associated software;
  wherein the electronic circuitry of the ECU comprises a processor for processing the output provided by the propulsion selection sensor;
  wherein the vehicular driver assistance system, responsive to processing the output of the propulsion selection sensor and responsive to determining that the vehicle enters a parking state, determines an entry propulsion direction used by the vehicle to enter a parking space;
  wherein the vehicular driver assistance system stores the determined entry propulsion direction used by the vehicle to enter the parking space;
  wherein the vehicular driver assistance system, responsive to the vehicle commencing exiting the parking state, determines an exit propulsion direction of the vehicle used by the vehicle to exit the parking space;
  wherein the vehicular driver assistance system compares the stored determined entry propulsion direction used by the vehicle to enter the parking space and the exit propulsion direction of the vehicle; and
  wherein the vehicular driver assistance system, responsive to determining that the stored determined entry propulsion direction used by the vehicle to enter the parking space is the same as the exit propulsion direction of the vehicle, provides an audible alert to a driver of the vehicle.

14. The vehicular driver assistance system of claim 13, wherein the vehicular driver assistance system, responsive to determining the entry propulsion direction used by the vehicle to enter the parking space, stores the determined entry propulsion direction in nonvolatile memory.

15. The vehicular driver assistance system of claim 13, further comprising a camera, wherein the vehicular driver assistance system, responsive to determining that the entry propulsion direction used by the vehicle to enter the parking space is the same as the exit propulsion direction of the vehicle and responsive to determining that an object is present in a path of the vehicle based on image data captured by the camera, provides the audible alert to the driver.

16. The vehicular driver assistance system of claim 13, further comprising an ultrasonic sensor, and wherein the vehicular driver assistance system, responsive to determining that the entry propulsion direction used by the vehicle to enter the parking space is the same as the exit propulsion direction of the vehicle and responsive to determining that an object is present in a path of the vehicle based on sensor data captured by the ultrasonic sensor, provides the audible alert to the driver.

17. The vehicular driver assistance system of claim 13, wherein the entry propulsion direction used to enter the parking space is a forward propulsion direction and wherein the exit propulsion direction of the vehicle is also the forward propulsion direction.

18. The vehicular driver assistance system of claim 13, wherein the entry propulsion direction used to enter the parking space is a reverse propulsion direction and wherein the exit propulsion direction of the vehicle is also the reverse propulsion direction.

19. A vehicular driver assistance system, the vehicular driver assistance system comprising:
  a propulsion selection sensor disposed at a vehicle equipped with the vehicular driver assistance system, the propulsion selection sensor operable to provide an output representative of a current direction of propulsion of the vehicle that is selected by a driver of the vehicle;
  an image sensor disposed at the vehicle equipped with the vehicular driver assistance system, the image sensor operable to capture image data exterior of the vehicle;
  an electronic control unit (ECU) comprising electronic circuitry and associated software;
  wherein the output of the propulsion selection sensor is provided to the ECU;
  wherein the electronic circuitry of the ECU comprises an image processor for processing image data captured by the image sensor and provided to the ECU;
  wherein the vehicular driver assistance system, responsive to the output of the propulsion selection sensor, determines an entry propulsion direction used by the vehicle to enter a parking space;
  wherein the vehicular driver assistance system stores the determined entry propulsion direction used by the vehicle to enter the parking space in nonvolatile memory;
  wherein the vehicular driver assistance system, responsive to the vehicle preparing to exit the parking space, determines an exit propulsion direction of the vehicle;
  wherein the vehicular driver assistance system compares the stored determined entry propulsion direction used by the vehicle to enter the parking space and the exit propulsion direction of the vehicle; and
  wherein the vehicular driver assistance system, responsive to determining that the stored determined entry propulsion direction used by the vehicle to enter the parking space is the same as the exit propulsion direction of the vehicle, and responsive to determining that image data captured by the image sensor is not provided to the ECU, provides an alert to a driver of the vehicle.

20. The vehicular driver assistance system of claim 19, wherein the alert comprises a visual alert displayed on a display disposed within the vehicle.

21. The vehicular driver assistance system of claim 19, wherein the alert comprises an audible alert.

\* \* \* \* \*